(12) United States Patent
Vega (10) Patent No.: US 9,982,906 B2
(45) Date of Patent: May 29, 2018

(54) REAL-TIME TEMPERATURE MANAGEMENT

(71) Applicant: Vivint, Inc., Provo, UT (US)

(72) Inventor: JonPaul Vega, Highland, UT (US)

(73) Assignee: Vivint, Inc., Provo, UT (US)

( * ) Notice: Subject to any disclaimer, the term of this patent is extended or adjusted under 35 U.S.C. 154(b) by 490 days.

(21) Appl. No.: 14/522,458

(22) Filed: Oct. 23, 2014

(65) Prior Publication Data

US 2016/0116178 A1    Apr. 28, 2016

(51) Int. Cl.
| | | |
|---|---|---|
| *F24F 11/66* | (2018.01) | |
| *F24F 11/00* | (2018.01) | |
| *G05B 15/02* | (2006.01) | |
| *G05B 19/042* | (2006.01) | |
| *G05B 13/02* | (2006.01) | |

(52) U.S. Cl.
CPC ........ *F24F 11/006* (2013.01); *F24F 11/0012* (2013.01); *F24F 11/0017* (2013.01); *F24F 11/0034* (2013.01); *F24F 11/0086* (2013.01); *F24F 11/30* (2018.01); *F24F 11/52* (2018.01); *F24F 11/62* (2018.01); *F24F 11/64* (2018.01); *F24F 11/66* (2018.01); *G05B 13/02* (2013.01); *G05B 15/02* (2013.01); *G05B 19/0426* (2013.01); *F24F 2011/0063* (2013.01); *F24F 2011/0065* (2013.01); *F24F 2011/0091* (2013.01); *F24F 2110/10* (2018.01); *F24F 2110/50* (2018.01); *F24F 2120/10* (2018.01); *G05B 2219/25387* (2013.01); *G05B 2219/2614* (2013.01); *G05B 2219/2639* (2013.01); *G05B 2219/2642* (2013.01); *Y02B 30/78* (2013.01)

(58) Field of Classification Search
CPC ................. F24F 11/006; F24F 11/0086; F24F 2011/0091; F24F 11/0012; F24F 11/0034; F24F 2011/0063; F24F 11/0017; F24F 2011/0065; G05B 15/02; G05B 13/02; G05B 19/0426; G05B 2219/25387; G05B 2219/2614; G05B 2219/2639; G05B 2219/2642
See application file for complete search history.

(56) References Cited

U.S. PATENT DOCUMENTS

| | | | |
|---|---|---|---|
| 6,094,306 | A | 7/2000 | Jain |
| 7,206,728 | B2 | 4/2007 | Ozeki et al. |
| 7,977,904 | B2 | 7/2011 | Berman et al. |
| 8,374,438 | B1 * | 2/2013 | Wagner .................... H04N 5/33 250/330 |

(Continued)

OTHER PUBLICATIONS

Melbourne City Council, Adaptive Thermal Comfort Report, Mar. 24, 2003, 10 pages.

*Primary Examiner* — Crystal J Barnes-Bullock
(74) *Attorney, Agent, or Firm* — Holland & Hart LLP (57) ABSTRACT

A method for real-time temperature management is described. In one embodiment, the method includes configuring a setting to trigger a thermal sensor to capture a thermal image of an area inside a premises and capturing, via the thermal sensor, a first thermal image of the area of the premises. In some embodiments, upon detecting the trigger, the method includes capturing, via the thermal sensor, a second thermal image of the area of the premises and identifying a thermal exchange in the area of the premises by comparing the first thermal image with the second thermal image.

20 Claims, 6 Drawing Sheets

(56) References Cited

U.S. PATENT DOCUMENTS

| | | | |
|---|---|---|---|
| 8,457,796 B2* | 6/2013 | Thind | G05B 15/02 |
| | | | 236/47 |
| 8,700,227 B2 | 4/2014 | Vass et al. | |
| 8,788,448 B2 | 7/2014 | Fadell et al. | |
| 8,791,417 B2* | 7/2014 | Scelzi | G01K 17/20 |
| | | | 250/338.1 |
| 9,304,500 B2* | 4/2016 | McMahon | G05B 15/02 |
| 9,416,987 B2* | 8/2016 | Ragland | F24F 11/0012 |
| 2008/0277486 A1* | 11/2008 | Seem | F24F 11/0009 |
| | | | 236/49.3 |
| 2010/0025483 A1* | 2/2010 | Hoeynck | F24F 11/001 |
| | | | 236/1 C |
| 2010/0235004 A1* | 9/2010 | Thind | G05B 15/02 |
| | | | 700/277 |
| 2012/0031984 A1 | 2/2012 | Feldmeier et al. | |
| 2013/0321637 A1* | 12/2013 | Frank | H04N 5/33 |
| | | | 348/152 |
| 2014/0031988 A1* | 1/2014 | Reeder | H04L 12/2816 |
| | | | 700/276 |
| 2014/0277765 A1* | 9/2014 | Karimi | G05B 15/02 |
| | | | 700/276 |
| 2015/0148967 A1* | 5/2015 | Logan | G06F 1/26 |
| | | | 700/276 |
| 2016/0018119 A1* | 1/2016 | Desmet | F04D 25/088 |
| | | | 165/237 |
| 2016/0261425 A1* | 9/2016 | Horton | G05B 15/02 |

* cited by examiner

| Correlated Environmental Data | | |
|---|---|---|
| Thermal Images | Indoor Conditions | Outdoor Conditions |
| Image_001.jpg | Starting Temp: 74 F<br>Target Temp: 72 F<br>Starting Humidity: 24% | Temp: 78 F<br>Humidity: 26% |
| Image_002.jpg | Starting Temp: 76 F<br>Target Temp: 73 F<br>Starting Humidity: 25% | Temp: 82 F<br>Humidity: 55% |
| Image_003.jpg | Starting Temp: 68 F<br>Target Temp: 70 F<br>Starting Humidity: 21% | Temp: 48 F<br>Humidity: 42% |
| ... | ... | ... |
| Image_00n.jpg | Starting Temp: 75 F<br>Target Temp: 70 F<br>Starting Humidity: 24% | Temp: 92 F<br>Humidity: 23% |

REAL-TIME TEMPERATURE MANAGEMENT

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in building and residential automation, and building and residential indoor climate control systems. For example, advancements in mobile devices allow users to monitor and/or adjust the indoor climate of a home or business from anywhere in the world. Nevertheless, benefits may be realized by providing systems and methods for improving automation and indoor climate control systems.

SUMMARY

According to at least one embodiment, a method for real-time temperature management is described. In one embodiment, the method may include configuring a setting to trigger a thermal sensor to capture a thermal image of an area inside a premises and capturing, via the thermal sensor, a first thermal image of the area of the premises. In some embodiments, upon detecting the trigger, the method may include capturing, via the thermal sensor, a second thermal image of the area of the premises and identifying a thermal exchange in the area of the premises by comparing the first thermal image with the second thermal image.

In some embodiments, the method may include monitoring one or more comfort variables in relation to the premises. The one or more comfort variables may include a humidity ratio, relative humidity, absolute humidity, specific humidity, wet-bulb temperature, dry-bulb temperature, dew point temperature, operative temperature, mean radiant temperature, vapor pressure, specific enthalpy, specific volume, and/or air movement. In some cases, the method may include analyzing a result of monitoring comfort variables of the premises in relation to a comfort chart. The comfort chart may include a graphical chart of at least one comfort variable in relation to at least one other comfort variable.

In one embodiment, the method may include calculating a comfort zone based on the thermal exchange and the analysis of the result of monitoring comfort variables of the premises in relation to a comfort chart. In some cases, the method may include generating a suggested temperature setting of the premises based on the calculated comfort zone, receiving a user input, and adjusting at least one of a temperature, humidity, and airflow setting of the premises based on the calculated comfort zone and the user input. In some cases, adjustment of at least one of a temperature, humidity, and airflow setting of the premises may be based on the calculated comfort zone and not a user input (e.g., no user input received or user input disregarded).

In one embodiment, the method may include capturing a plurality of thermal images of a bedroom of the premises in which an occupant retires to bed and correlating, at the time each thermal image is captured, the plurality of captured thermal images with one or more monitored environmental conditions relative to the premises. Upon detecting the occupant retiring to bed, the method may include capturing a thermal image of the bedroom and detecting one or more current environmental conditions relative to the premises.

In one embodiment, the method may include identifying a closest match between the one or more current environmental conditions and one or more monitored environmental conditions correlated with the plurality of captured thermal images and identifying a captured thermal image from the plurality of captured thermal images correlated with the one or more monitored environmental conditions that matches closest to the one or more current environmental conditions. In some cases, the method may include determining a thermal exchange of the bedroom by comparing the captured thermal image of the bedroom with the identified captured thermal image from the plurality of captured thermal images. The method may include calculating a suggested target temperature based on an analysis of the determined thermal exchange in light of any detected adjustment to the target indoor temperature relative to the identified captured thermal image.

A computing device configured for real-time temperature management is also described. The computing device may include a processor and memory in electronic communication with the processor. The memory may store computer executable instructions that when executed by the processor cause the processor to perform the steps of configuring a setting to trigger a thermal sensor to capture a thermal image of an area inside a premises and capturing, via the thermal sensor, a first thermal image of the area of the premises. In some embodiments, upon detecting the trigger, the memory may store computer executable instructions that when executed by the processor cause the processor to perform the steps of capturing, via the thermal sensor, a second thermal image of the area of the premises and identifying a thermal exchange in the area of the premises by comparing the first thermal image with the second thermal image.

A non-transitory computer-readable storage medium storing computer executable instructions is also described. When the instructions are executed by a processor, the execution of the instructions may cause the processor to perform the steps of configuring a setting to trigger a thermal sensor to capture a thermal image of an area inside a premises and capturing, via the thermal sensor, a first thermal image of the area of the premises. In some embodiments, upon detecting the trigger, the memory may store computer executable instructions that when executed by the processor cause the processor to perform the steps of capturing, via the thermal sensor, a second thermal image of the area of the premises and identifying a thermal exchange in the area of the premises by comparing the first thermal image with the second thermal image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate generally to improving climate control in a premises environment. More specifically, the systems and methods described herein relate to real-time temperature management in relation to a building and residential automation system.

The typical heating ventilation air condition (HVAC) system is composed of a single thermostat located in a central location. This single thermostat controls the heating and cooling of an entire home. Different areas of the home, however, experience varying amounts of heating and cooling due to outdoor weather conditions. A south-facing, unshaded room in the summer may experience a higher room temperature than a south-facing room of the same home that is shaded by a large tree. Likewise, a south-facing room is likely to be warmer due to outdoor conditions than a northfacing room, and a top-level room is likely to be warmer than a lower-level room. Nevertheless, the heating and cooling of a typical home or office is controlled by a central thermostat, resulting in some rooms being served adequately and others being served inadequately. Moreover, the heating and cooling is controlled by a single input, that of an occupant adjusting a temperature setting on a thermostat. Accordingly, the systems and methods described herein improve the typical HVAC system to address such concerns.

The systems and methods described herein may provide accurate, frictionless, inferential automation achieved from pattern-based learning and real-time quantitative environmental and biological learning. Based on "Human Comfort Variables of Environmental Temperature Control," a thermal sensor and data processor may be configured to recognize specific user preferences under specific conditions and continually manage a target indoor temperature. Accounting for thermal control variables, real-time temperature management may be achieved in conjunction with the Heat Balance equation $M=E \pm R \pm C \pm S$, where M=Metabolic Rate, E=Rate of heat loss by evaporation, respiration, and elimination in relation to humidity, R=Radiation Rate or Median Radiant Temperature (MRT), C=Conduction and convection rate, and S=Stored Body Heat, S being measured by the weighted average temperature of an individual surface. Upon determining a heat balance exchange in relation to an area of a premises, a Predicted Temperature may be calculated based on the Standard Comfort Chart and a User Preferred Thermal Index. The User Preferred Thermal Index may incorporate current American Society of Heating, Refrigeration, and Air-Conditioning Engineers (ASHRAE) Thermal Comfort Standards; Room Air Temperature Guidelines, Dry & Wet Bulb Temperatures and Globe Temperature. These measurements may be weighted against recorded Previous User Preference at similar conditions to estimate the Predicted Temperature.

In one embodiment, the present systems and methods remedy the problems of current HVAC systems by incorporating temperature comfort logic, real-time temperature management, and in the case of homes, learning sleeping patterns to improve the efficient use of the HVAC system in the home. Thus, one aspect of the present disclosure relates to systems, methods and related devices for improving the efficiency of heating ventilation and air conditioning (HVAC) systems via monitoring and controlling one or more aspects of an environment within a premises. Present HVAC systems are typically controlled by a centrally located thermostat. The centrally located thermostat usually controls a single HVAC heating and cooling unit. A user may set the thermostat to turn on cooling when the thermostat registers a high temperature threshold, and set the thermostat to turn on heating when the thermostat registers a low temperature threshold. For example, a user may set the thermostat to trigger the furnace turning on when the thermostat registers 68 degrees Fahrenheit or less. Likewise, a user may set the thermostat to trigger the air conditioning unit when the thermostat registers 72 degrees Fahrenheit or more. The problem with using only temperature to control a climate of an entire premises lies in the fact that the average zone of comfort within a premises is affected by more than just temperature. A comfort zone within the premises may be controlled by such factors as humidity measurements, temperature measurements, air movement, etc. For example, the comfort zone may be determined by relative humidity, absolute humidity, specific humidity, humidity ratio, wet-bulb temperature, dry-bulb temperature, dew point temperature, operative temperature, mean radiant temperature, vapor pressure, specific enthalpy, specific volume, air movement, the season of the year, the type of clothing worn by an occupant, and the activity level of an occupant. Accordingly, the present systems and methods may be configured to monitor one or more factors of an environment of a premises in order to calculate, in real-time, a comfort zone based on current conditions (e.g., calculate a range of temperatures/humidity for ideal comfort, etc.).

In some embodiments, one or more thermal images of an area within the premises may be captured. The detected thermal exchange may be analyzed in relation to the monitored environment and/or a standards-based comfort chart that charts the factors of the comfort zone mentioned above. Based on the calculated comfort zone, the present systems and methods may control one or more aspects of an HVAC system to align the interior climate of the premises with the calculated comfort zone. Thus, the present systems and methods may monitor the environment of the premises, detect a rate of thermal exchange based on a capture thermal image, calculate an ideal comfort zone, and adjust an HVAC system based on the calculated comfort zone. In some cases, the present systems and methods may display a suggested HVAC setting based on the calculated comfort zone. The system may receive a user input and adjust an aspect of the HVAC system based on the user input and the calculated comfort zone.

In some embodiments, the present systems and methods may monitor the sleeping habits of an occupant of a home. Sleeping patterns of the occupant may be determined from the monitoring of the sleeping habits and a thermal image may be captured in relation to the occupant retiring for the night. In some cases, the present systems and methods may adjust a temperature, humidity, or airflow setting of the premises based on the calculated comfort zone and the user input.

Figure 1:
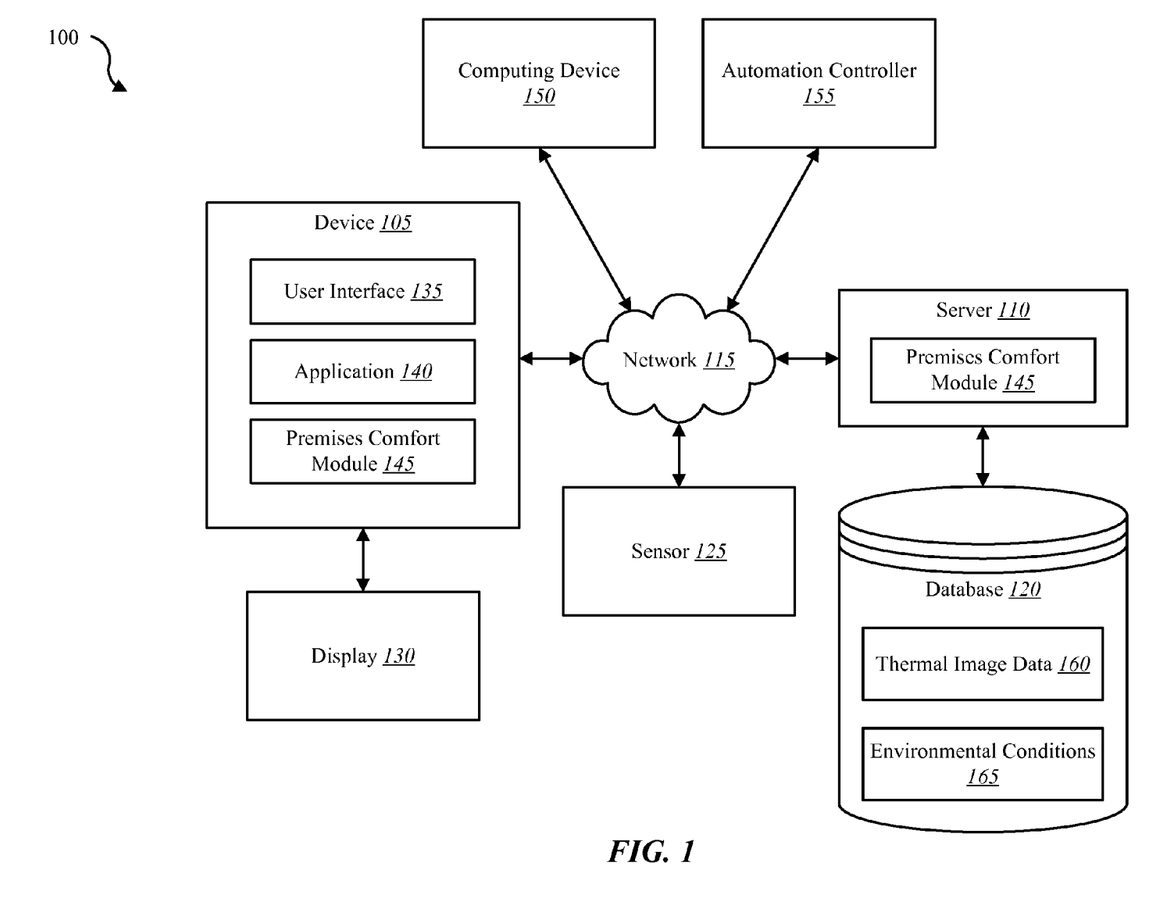
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a sensor 125, a display 130, a computing device 150, an automation controller 155, and a network 115 that allows the device 105, the server 110, the computing device 150, automation controller 155, and sensor 125 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a building automation controller integrated within device 105, or as depicted, may be in communication with an automation controller via network 115. Examples of the automation controller 155 may include any device configured to control a building such as a home, a business, a government facility, etc. Accordingly, examples of automation controller 155 include any combination of a dedicated building automation computing device (e.g., wall-mounted controller), a personal computing device (e.g., laptop, desktop, etc.), a mobile computing device (e.g., tablet computing device, smartphone, etc.), and the like. Examples of computing device 150 may include any combination of a mobile computing device, a laptop, a desktop, a server, a media set top box, etc. Examples of server 110 may include any combination of a data server, a cloud server, a server associated with an automation service provider, proxy server, mail server, web server, application server, database server, communications server, file server, home server, mobile server, name server, etc.

Examples of sensor 125 may include any combination of a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, thermal imaging sensor, heat sensor, infrared sensor, heartbeat sensor, breathing sensor, oxygen sensor, carbon dioxide sensor, brain wave sensor, movement sensor, voice sensor, other types of sensors, actuators, or combinations thereof. Sensor 125 may represent one or more separate sensors or a combination of two or more sensors in a single device. For example, sensor 125 may represent one or more camera sensors and one or more motion sensors connected to environment 100. Sensor 125 may be integrated with an identity detection system such as a facial recognition system and/or a voice recognition system. Although sensor 125 is depicted as connecting to device 105 over network 115, in some embodiments, sensor 125 may connect directly to or within device 105.

In some embodiments, sensor 125 may include a thermal imaging sensor or thermographic camera configured to capture thermal images, or thermograms, of objects within a field of view. Thermal images, or thermograms, are visual displays of the amount of infrared energy emitted, transmitted, and reflected by an object. A thermal imaging device may determine relative and/or absolute temperatures of objects based on a measured Incident Energy, where Incident Energy=Emitted Energy+Transmitted Energy+Reflected Energy, and where Incident Energy is the energy profile when viewed through a thermal imaging camera. Emitted Energy is generally what is intended to be measured. Transmitted Energy is the energy that passes through the subject from a remote thermal source. Reflected Energy is the amount of energy that reflects off the surface of the object from a remote thermal source. If the object is radiating at a higher temperature than its surroundings, then power transfer takes place and power radiates from warm to cold following the principle stated in the Second Law of Thermodynamics. If there are cool and warm objects in the thermogram, the cool object absorbs the radiation emitted by the warm object. The ability of both objects to emit or absorb this radiation is called emissivity.

Sensors in thermal imagers may rely on thermal and/or quantum effects to capture thermograms. The sensors may include thermocouples, bolometers, thermopiles, pyroelectric detectors, photoconductors, and photovoltaic diodes. The sensor may be calibrated for emissivity, etc., in order to measure a relatively accurate temperature relative to a captured thermal image. In some cases, an infrared sensor such as a passive infrared (PIR) motion detector sensor may be calibrated to capture thermal images from which relatively accurate temperatures may be determined. Without calibration, a PIR sensor may be configured to at least measure changes in infrared emission that correspond directly to temperature changes. For example, a first captured image may be compared to a second captured image.

Additionally, or alternatively, sensor 125 may be integrated with a home appliance or fixture such as a light bulb fixture, thermostat, electrical outlet, light switch, motion sensor, etc. Sensor 125 may include an accelerometer to enable sensor 125 to detect a movement. For example, sensor 125 may be carried by an occupant. Sensor 125 may include a wireless communication sensor 125 configured to send and receive data and/or information to and from one or more devices in environment 100. Additionally, or alternatively, sensor 125 may include a GPS sensor to enable sensor 125 to track a location of sensor 125 attached to an occupant and/or object. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a user interface 135, application 140, and premises comfort module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, premises comfort module 145, automation controller 155, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a premises comfort module 145. For example, device 105 may include application 140 that allows device 105 to interface with automation controller 155 via premises comfort module 145 located on another device such as computing device 150 and/or server 110. In some embodiments, device 105, automation controller 155, and server 110 may include a premises comfort module 145 where at least a portion of the functions of premises comfort module 145 are performed separately and/or concurrently on device 105, automation controller 155, and/or server 110. Likewise, in some embodiments, a user may access the functions of device 105 and/or automation controller 155 (directly or through device 105 via premises comfort module 145) from computing device 150. For example, in some embodiments, computing device 150 includes a mobile application that interfaces with one or more functions of device 105, automation controller 155, premises comfort module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include thermal image data 160 and data on environmental conditions 165. For example, device 105 may access thermal image data 160 in database 120 over network 115 via server 110. Thermal image data 160 may include data relative to captured thermal images. Thus, thermal image data 160 may include captured thermal images as well as additional data derived from the captured thermal images such as absolute temperature, relative temperature, temperature differentials, thermal exchanges, etc. The recorded environmental conditions 165 may include data related to indoor and outdoor conditions such as temperature, humidity, atmospheric pressure, air movement, etc.

Premises comfort module 145 may enable real-time temperature management. In some embodiments, premises comfort module 145 may be configured to perform the systems and methods described herein in conjunction with user interface 135 and application 140. Further details regarding the premises comfort module 145 are discussed below.

Figure 2:
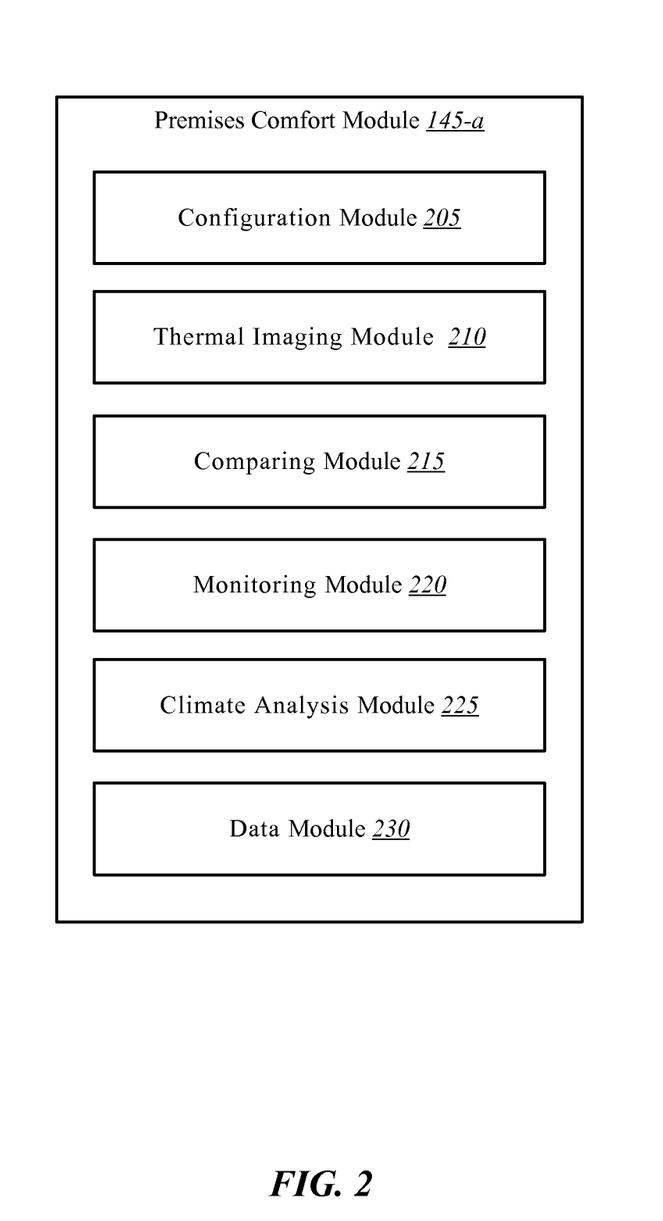
FIG. 2 is a block diagram illustrating one example of a premises comfort module.

FIG. 2 is a block diagram illustrating one example of a premises comfort module 145-*a*. Premises comfort module 145-*a* may be one example of premises comfort module 145 depicted in FIG. 1. As depicted, premises comfort module 145-*a* may include configuration module 205, a thermal imaging detection module 210, a comparing module 215, a monitoring module 220, a climate analysis module 225, and a data module 230.

In one embodiment, configuration module 205 may enable an occupant of a premises to configure an environment (e.g., environment 100 of FIG. 1) for real-time temperature management. In some cases, configuration module 205 may configure a setting to trigger a thermal sensor to capture a thermal image of an area inside the premises. Triggers may include occupant identification (e.g., facial recognition, key fob identifier, etc.), determining a location of an occupant, detecting an adjustment to a target indoor temperature (e.g., manual adjustment at a thermostat, remote adjustment via a smart phone, automatic adjustment based on a schedule, etc.), detecting an HVAC system initiating a heating or cooling cycle, detecting an occupant retiring to bed, and the like. As an example, a thermostat may be configured with a target indoor temperature of 72 degrees. As the heat of a day increases, the indoor temperature within the premises may increase triggering an HVAC cooling cycle to initiate. Upon detecting this HVAC cooling cycle, thermal imaging module 210 may be triggered to capture a thermal image of an area of the premises. Additionally, or alternatively, monitoring module 220 may detect an occupant inside and/or outside the premises via motion detection and/or adjusting a thermostat and trigger thermal imaging module 210 to capture a thermal image of an area of the premises. The thermal imaging module 210 may be configured to measure an occupant's weighted extremity surface temperature from a captured thermal image. The thermal imaging module 210 may determine a thermal exchange based on one or more captured thermal images. Based on current outdoor and indoor conditions in relation to historic data (e.g., recorded indoor/outdoor conditions, previously captured thermal images, previously calculated thermal exchange, etc.), premises comfort module 145-*a* may learn preferred temperature ranges based on a thermal exchange determined from a captured thermal image. The premises comfort module 145-*a* may then, in real-time, calculate an effective temperature, and suggest, via a generated notification, an occupant adjust the target indoor temperature based on the calculated effective temperature. Over time, premises comfort module 145-*a* may calibrate real-time temperature management based on user acceptance of suggested climate adjustments. The premises comfort module 145-*a* may track an accuracy relative to the estimated effective temperature and the actual indoor climate settings (e.g., actual target indoor temperature setting, etc.). Upon satisfying a threshold, premises comfort module 145-*a* may make real-time temperature adjustments automatically without user input.

Thermal imaging module 210 may capture, in conjunction with a thermal sensor (e.g., sensor 125 of FIG. 1), a first thermal image of the area of the premises. Upon detecting the trigger, thermal imaging module 210 may capture a second thermal image of the area of the premises. Comparing module 215 may identify a thermal exchange in the area of the premises by comparing the first thermal image with the second thermal image. Accordingly, variations in temperature among objects in the captured thermal images may be detected. For example, an object may appear in both the first and second thermal images (e.g., furniture such as a chair or a couch, a lamp, a clock, a hanging picture, etc.). The object may be at different temperatures when each image is captured. Accordingly, a comparison may determine the temperature of one or more objects in the area relative to the times the two images are captured. Indoor and/or outdoor conditions at the times the two images are captured may be detected and stored with the captured thermal images. In some cases, temperature variations between objects in a single captured thermal image of an area in a premises may be detected and used to determine one or more indoor conditions relative to the area (e.g., temperature, thermal exchange, etc.). In some cases, an ambient temperature may be determined based on one or more captured thermal images.

In some embodiments, monitoring module 220 may monitor one or more comfort variables in relation to the premises. The one or more comfort variables may include at least one of a humidity ratio, relative humidity, absolute humidity, specific humidity, wet-bulb temperature, dry-bulb temperature, dew point temperature, operative temperature, mean radiant temperature, vapor pressure, specific enthalpy, specific volume, and air movement. Dry-bulb temperature is that of an air sample, as determined by an ordinary thermometer. The dry-bulb temperature is the temperature indicated by a thermometer exposed to the air in a place sheltered from direct solar radiation. Wet-bulb temperature is a thermodynamic property of a mixture of air and water vapor. The wet-bulb temperature is that of an air sample after it has passed through a constant-pressure, ideal, adiabatic saturation process, that is, after the air has passed over a large surface of liquid water in an insulated channel. Dew point temperature is the temperature at which a moist air sample at the same pressure would reach water vapor "saturation." Relative humidity is the ratio of the mole fraction of water vapor to the mole fraction of saturated moist air at the same temperature and pressure. Relative humidity is dimensionless, and is usually expressed as a percentage. Humidity ratio is the proportion of mass of water vapor per unit mass of dry air at the given conditions (dry-bulb temperature, wet-bulb temperature, relative humidity, etc.). It is also known as the moisture content or mixing ratio. Specific enthalpy, symbolized by h, is the sum of the internal (heat) energy of the moist air in question, including the heat of the air and water vapor within. Also called heat content per unit mass. Specific volume is the volume of the mixture (dry air plus the water vapor) containing one unit of mass of "dry air."

In some embodiments, climate analysis module 225 may analyze conditions relative to an indoor climate of a premises. In some cases, climate analysis module 225 may analyze a result of monitoring comfort variables of the premises in relation to a comfort chart, the comfort chart comprising a graphical chart of at least one comfort variable in relation to at least one other comfort variable. Factors that influence thermal comfort may be those that determine heat gain and loss, such as metabolic rate, clothing insulation, air temperature, mean radiant temperature, air speed, and relative humidity. Additional factors of comfort may include odor, dust, aesthetics, acoustics, and lighting. Control factors of comfort may include ambient temperature, radiant temperature, humidity, air motion, body heat, and/or clothing type.

In some embodiments, climate analysis module 225 may calculate a comfort zone based on the thermal exchange and the analysis of the result of monitoring comfort variables of the premises in relation to a comfort chart. The climate analysis module 225 may analyze the identified thermal exchange in relation to a comfort chart. In some cases, configuration module 205 may display a suggested temperature setting of the premises based on the calculated comfort zone. Configuration module 205 may receive a user input and climate analysis module 225 may adjust at least one of a temperature, humidity, and airflow setting of the premises based on the calculated comfort zone and the user input. In one embodiment, climate analysis module 225 may adjust at least one of a temperature, humidity, and airflow setting of the premises based on the calculated comfort zone.

In one embodiment, thermal imaging module 210 may capture a plurality of thermal images of a bedroom of the premises in which an occupant retires to bed. Data module 230 may correlate, at the time each thermal image is captured, the plurality of captured thermal images with one or more monitored environmental conditions relative to the premises. The monitored environment conditions may include indoor and/or outdoor conditions. For example, the indoor temperature settings, including any adjustments to a target indoor temperature (e.g., adjusting of a thermostat setting) at the time the thermal image is captured may be correlated with the captured thermal image. Additionally, or alternatively, the monitored environmental conditions may include outdoor conditions such as outdoor temperature, outdoor humidity, atmospheric pressure, level of cloud cover, etc. Upon detecting the occupant retiring to bed, thermal imaging module 210 may capture a thermal image of the bedroom. In some cases, monitoring module 220 may detect one or more current environmental conditions relative to the premises. Data module 230 may identify a closest match between the one or more current environmental conditions and one or more monitored environmental conditions correlated with the plurality of captured thermal images. Data module 230 may identify a captured thermal image from the plurality of captured thermal images correlated with the one or more monitored environmental conditions that matches closest to the one or more current environmental conditions. In some cases, comparing module 215 may determine a thermal exchange of the bedroom by comparing the captured thermal image of the bedroom with the identified captured thermal image from the plurality of captured thermal images. Climate analysis module 225 may calculate a suggested target temperature based on an analysis of the determined thermal exchange in light of any detected adjustment to the target indoor temperature relative to the identified captured thermal image. Climate analysis module 225 may learn and predict habits and patterns relative to occupancy in the premises and relative indoor/outdoor conditions, and suggest thermostat settings based on the learned patterns, eventually making real-time indoor climate adjustments automatically without user input.

Accordingly, premises comfort module 145-*a* may be configured to analyze current indoor/outdoor conditions in relation to one or more captured thermal images and a comfort chart. The premises comfort module 145-*a* may analyze this information and perform calculations related to real-time indoor climate management. The premises comfort module 145-*a* may learn averages and determine expected indoor climate conditions based on current indoor/outdoor conditions in relation to historic data. The premises comfort module 145-*a* may learn user preferences by season and outdoor conditions. Each time a target indoor temperature adjustment is detected, premises comfort module 145-*a* may capture a thermal image and perform analysis on the thermal image in relation to current indoor/outdoor conditions, previous indoor/outdoor conditions, and previously captured thermal images. The premises comfort module 145-*a* may calculate Incident Energy and/or use the Heat Balance equation in its analysis. Each point of analysis may further refine the real-time indoor climate management to the point that the suggested target indoor temperature (e.g. effective temperatures) may satisfy a predetermined threshold (e.g., percentage of accuracy, measure of variation between user adjustments and suggested adjustments, etc.), whereupon premises comfort module 145-*a* may adjust indoor climate settings automatically without user input.

Figure 3:
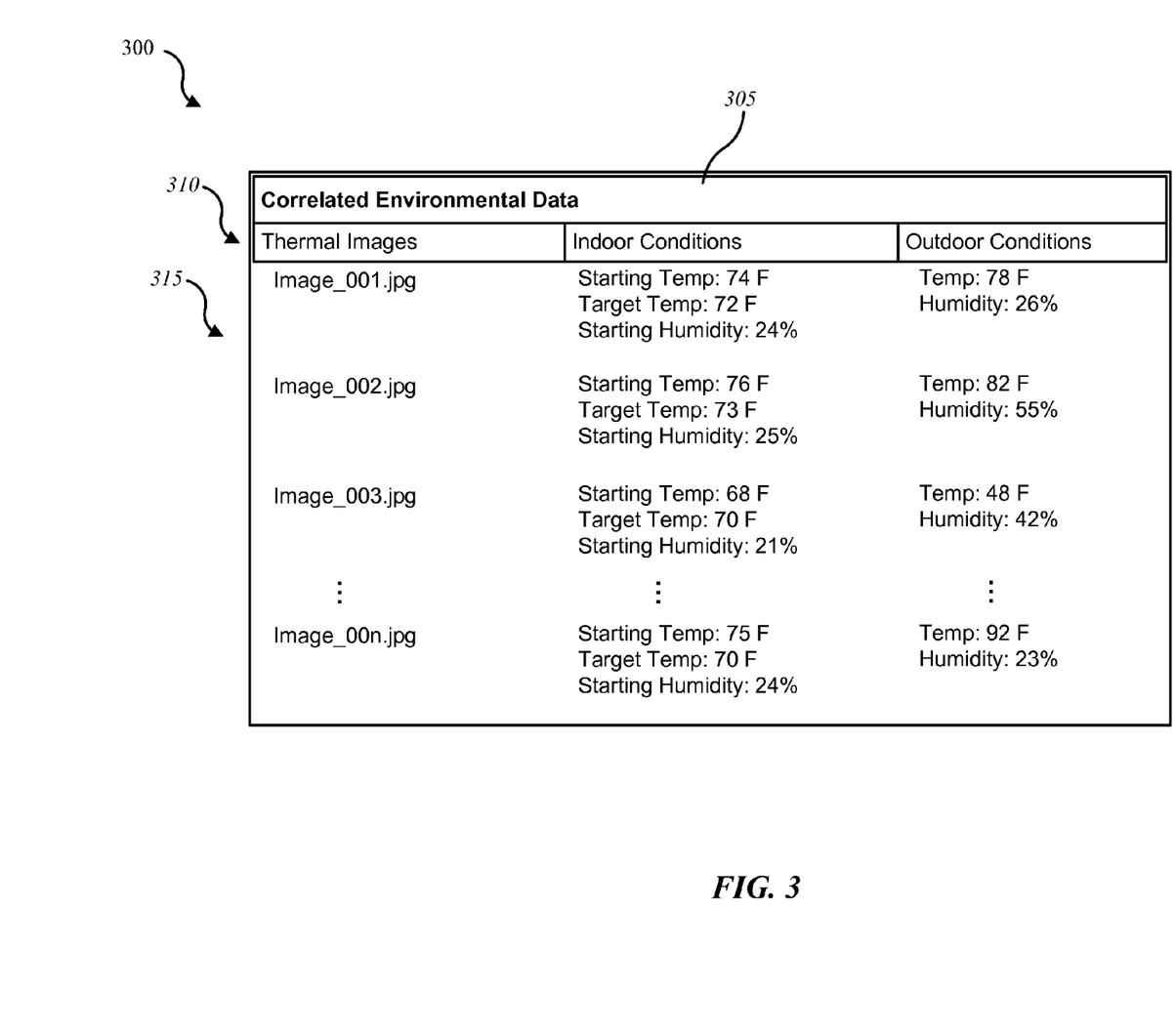
FIG. 3 is a block diagram illustrating one example of a database entry for real-time temperature management.

FIG. 3 is a block diagram illustrating one example of a database entry 300 for real-time temperature management. As depicted, the database entry 300 may include a title section 305, a subtitle section 310, and a data section 315. For example, as illustrated, the database entry 300 may include a title section 305 of "Correlated Environmental Data," indicating the stored data relates to gathered environmental data (e.g., monitored indoor/outdoor conditions). The entry 300 may include subtitles such as "Thermal Images," "Indoor Conditions," and "Outdoor Conditions," indicating the type of data stored. The data section 315 may include the recorded data. Thus, the data section 315 may include one or more thermal images under the "Thermal Images" subtitle, for example. As illustrated, each stored thermal image may be correlated to recorded indoor/outdoor conditions. For example, at the time the depicted thermal image "Image_001.jpg" is captured, indoor and outdoor conditions may be detected. As depicted, indoor conditions at the time may include a starting temperature of 74 degrees Fahrenheit, meaning that at the time a HVAC cooling or heating cycle is started and when the thermal image was captured, the indoor temperature was 74 degrees Fahrenheit, the target temperature was 72 degrees Fahrenheit, and the indoor humidity was 24%. The outdoor conditions at that time included an outdoor temperature of 78 degrees Fahrenheit and a humidity of 26%. Accordingly, premises comfort module 145 may query entry 300 for previously recorded data in order to analyze current indoor/outdoor conditions in relation to a target temperature setting and a current captured thermal image.

Figure 4:
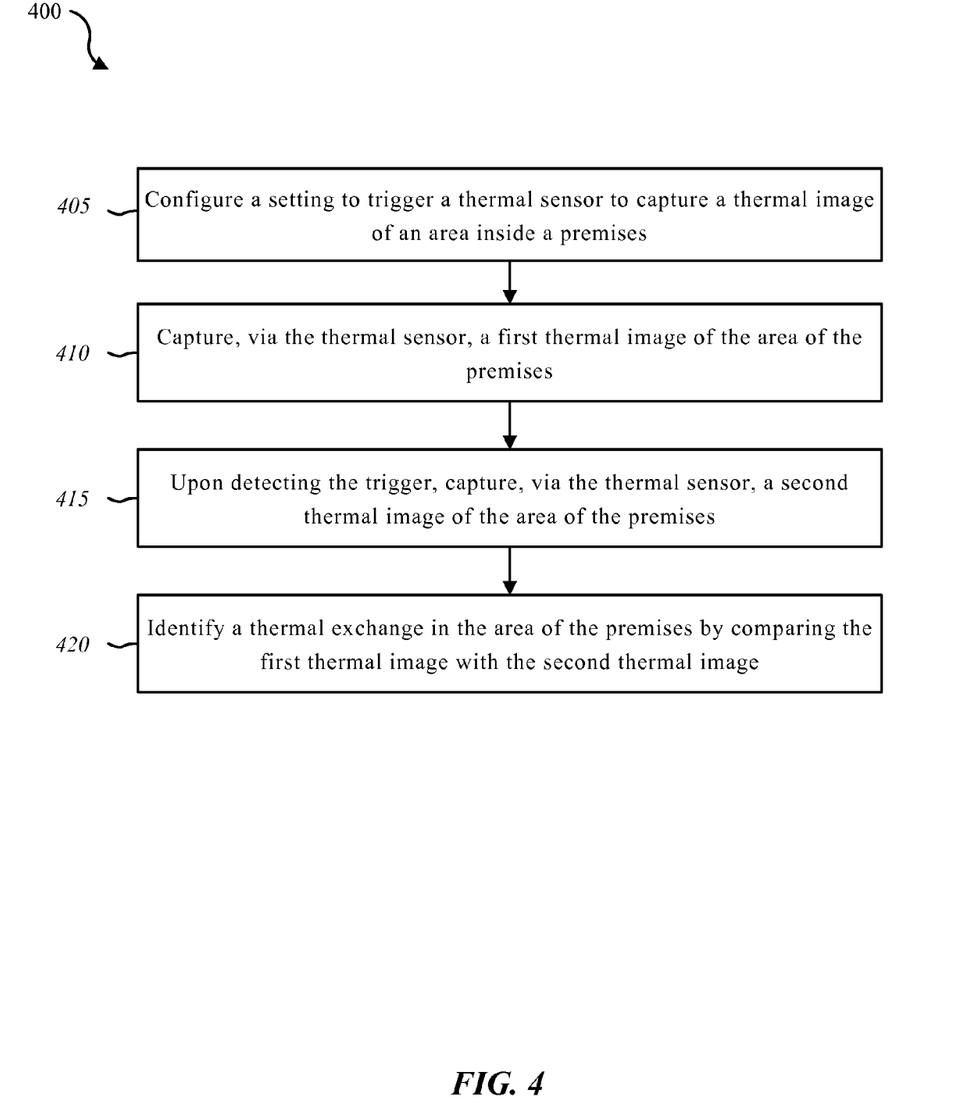
FIG. 4 is a flow diagram illustrating one embodiment of a method for real-time temperature management.

FIG. 4 is a flow diagram illustrating one embodiment of a method 400 for real-time temperature management. In some configurations, the method 400 may be implemented by the premises comfort module 145 illustrated in FIGS. 1 and/or 2. In some configurations, the method 400 may be implemented in conjunction with the application 140 and/or the user interface 135 illustrated in FIG. 1.

At block 405, a setting may be configured to trigger a thermal sensor to capture a thermal image of an area inside a premises. At block 410, a first thermal image of the area of the premises may be captured via the thermal sensor. At block 415, upon detecting the trigger, a second thermal image of the area of the premises may be captured via the thermal sensor. At block 420, a thermal exchange in the area of the premises may be identified by comparing the first thermal image with the second thermal image.

Figure 5:
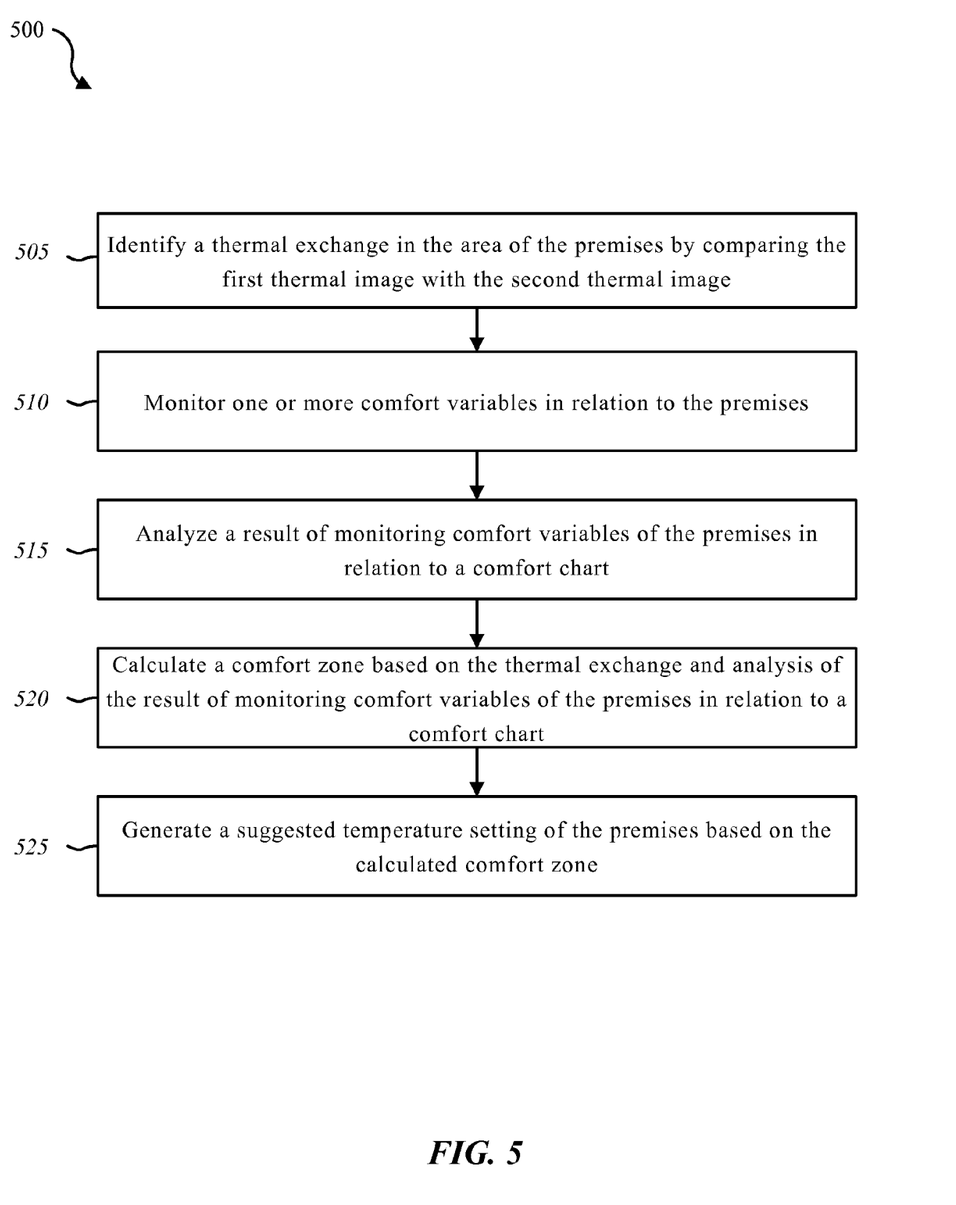
FIG. 5 is a flow diagram illustrating one embodiment of a method for real-time temperature management.

FIG. 5 is a flow diagram illustrating one embodiment of a method 500 for real-time temperature management. In some configurations, the method 500 may be implemented by the premises comfort module 145 illustrated in FIG. 1 or 2. In some configurations, the method 500 may be implemented in conjunction with the application 140 and/or the user interface 135 illustrated in FIG. 1.

Figure 6:
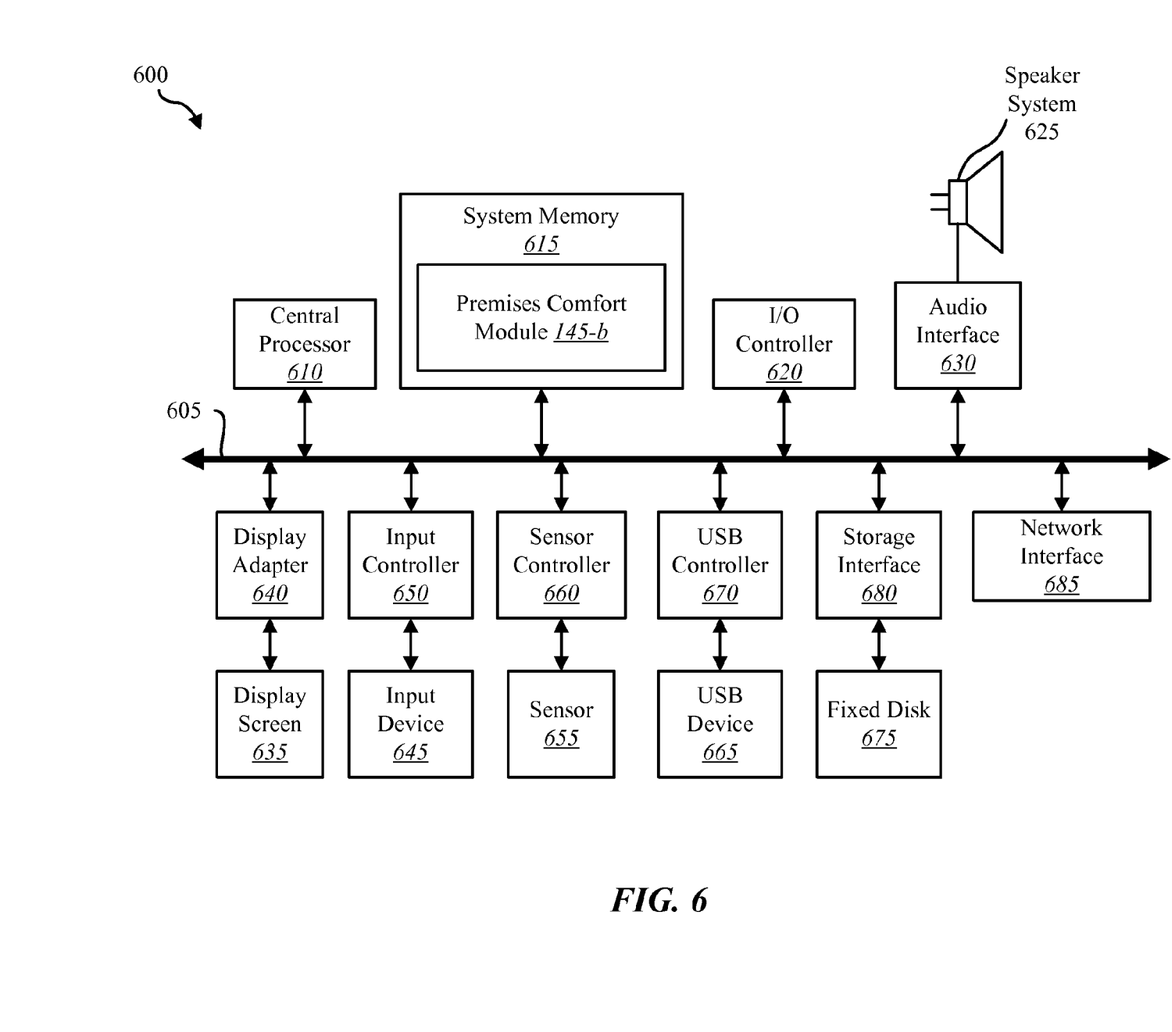
FIG. 6 depicts a block diagram of a computer system suitable for implementing the present systems and methods.

At block 505, a thermal exchange in the area of the premises may be identified by comparing the first thermal image with the second thermal image. At block 510, one or more comfort variables may be monitored in relation to the premises. In some cases, the one or more comfort variables may include a humidity ratio, relative humidity, absolute humidity, specific humidity, wet-bulb temperature, dry-bulb temperature, dew point temperature, operative temperature, mean radiant temperature, vapor pressure, specific enthalpy, specific volume, and/or an air movement. At block 515, a result of monitoring comfort variables of the premises may be analyzed in relation to a comfort chart. In some cases, the comfort chart may include a graphical chart of at least one comfort variable in relation to at least one other comfort variable. At block 520, a comfort zone may be calculated based on the thermal exchange and the analysis of the result of monitoring comfort variables of the premises in relation to a comfort chart. At block 525, a suggested temperature setting of the premises may be displayed based on the calculated comfort zone. In some embodiments, a user input may be received and at least one of a temperature, humidity, and airflow setting of the premises may be adjusted based on the calculated comfort zone and/or the user input FIG. 6 depicts a block diagram of a computing device 600 suitable for implementing the present systems and methods. The device 600 may be an example of device 105, computing device 150, automation controller 155 and/or server 110 illustrated in FIG. 1. In one configuration, controller 600 includes a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the premises comfort module 145-$b$ to implement the present systems and methods may be stored within the system memory 615. Applications (e.g., application 140) resident with controller 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of controller 600, can connect to a standard computer readable medium for storage and/or retrieval of information, such as a fixed disk drive 675. Fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS® ANDROID®, MS-DOS®, MS-WINDOWS®, OS/2® UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for real-time temperature management, comprising:
    configuring, via a processor of an automation control panel, a setting to trigger a thermal sensor to capture a thermal image of an area inside a premises, the thermal sensor being communicatively coupled to the automation control panel;
    capturing, via the thermal sensor, a first thermal image of the area inside the premises;
    detecting, via the processor, the trigger after capturing the first thermal image, the trigger comprising detecting an occupant of the premises retiring for bed;
    upon detecting the trigger, capturing, via the thermal sensor, a second thermal image of the area inside the premises;
    comparing, via the processor, the first thermal image with the second thermal image to identify a thermal exchange in the area inside the premises, wherein comparing the first thermal image with the second thermal image comprises comparing the temperature of an object as captured in the first thermal image to the temperature of the object as captured in the second thermal image; and
    improving an efficiency of a heating ventilation and air conditioning (HVAC) system at the premises by adjusting the HVAC system based at least in part on a result of the comparing.

2. The method of claim 1, further comprising:
    monitoring one or more comfort variables in relation to the premises, the one or more comfort variables comprising a humidity ratio, relative humidity, absolute humidity, specific humidity, wet-bulb temperature, dry-bulb temperature, dew point temperature, operative temperature, mean radiant temperature, vapor pressure, specific enthalpy, specific volume, and air movement.

3. The method of claim 2, further comprising:
    analyzing a result of monitoring comfort variables of the premises in relation to a comfort chart, the comfort chart comprising a graphical chart of at least one comfort variable in relation to at least one other comfort variable.

4. The method of claim 3, further comprising:
    calculating a comfort zone based on the thermal exchange and the analysis of the result of monitoring comfort variables of the premises in relation to a comfort chart.

5. The method of claim 4, further comprising:
generating a suggested temperature setting of the premises based on the calculated comfort zone;
receiving a user input; and
adjusting at least one of a temperature, humidity, and airflow setting of the premises based on the calculated comfort zone and the user input.

6. The method of claim 4, further comprising:
adjusting at least one of a temperature, humidity, and airflow setting of the premises based on the calculated comfort zone.

7. The method of claim 1, further comprising:
capturing a plurality of thermal images of a bedroom of the premises in which an occupant retires to bed; and
correlating, at the time each thermal image is captured, the plurality of captured thermal images with one or more monitored environmental conditions relative to the premises.

8. The method of claim 7, further comprising:
upon detecting the occupant retiring to bed, capturing a thermal image of the bedroom; and
detecting one or more current environmental conditions relative to the premises.

9. The method of claim 8, further comprising:
identifying a closest match between the one or more current environmental conditions and one or more monitored environmental conditions correlated with the plurality of captured thermal images; and
identifying a captured thermal image from the plurality of captured thermal images correlated with the one or more monitored environmental conditions that matches closest to the one or more current environmental conditions.

10. The method of claim 9, further comprising:
determining a thermal exchange of the bedroom by comparing the captured thermal image of the bedroom with the identified captured thermal image from the plurality of captured thermal images; and
calculating a suggested target temperature based on an analysis of the determined thermal exchange in light of any detected adjustment to a target indoor temperature relative to the identified captured thermal image.

11. A computing device configured for real-time temperature management, comprising:
a processor of an automation control panel;
memory in electronic communication with the processor, wherein the memory stores computer executable instructions that when executed by the processor cause the processor to perform the steps of:
configuring a setting to trigger a thermal sensor to capture a thermal image of an area inside a premises, the thermal sensor being communicatively coupled to the automation control panel;
capturing, via the thermal sensor, a first thermal image of the area inside the premises;
detecting, via the processor, the trigger, the trigger comprising detecting an occupant of the premises retiring for bed;
upon detecting the trigger, capturing, via the thermal sensor, a second thermal image of the area inside the premises;
comparing, via the processor, the first thermal image with the second thermal image to identify a thermal exchange in the area inside the premises, wherein comparing the first thermal image with the second thermal image comprises comparing the temperature of an object as captured in the first thermal image to the temperature of the object as captured in the second thermal image; and
improving an efficiency of a heating ventilation and air conditioning (HVAC) system at the premises by adjusting the HVAC system based at least in part on a result of the comparing.

12. The computing device of claim 11, wherein the instructions executed by the processor cause the processor to perform the steps of:
monitoring one or more comfort variables in relation to the premises, the one or more comfort variables comprising a humidity ratio, relative humidity, absolute humidity, specific humidity, wet-bulb temperature, dry-bulb temperature, dew point temperature, operative temperature, mean radiant temperature, vapor pressure, specific enthalpy, specific volume, and air movement.

13. The computing device of claim 12, wherein the instructions executed by the processor cause the processor to perform the steps of:
analyzing a result of monitoring comfort variables of the premises in relation to a comfort chart, the comfort chart comprising a graphical chart of at least one comfort variable in relation to at least one other comfort variable.

14. The computing device of claim 13, wherein the instructions executed by the processor cause the processor to perform the steps of:
calculating a comfort zone based on the thermal exchange and the analysis of the result of monitoring comfort variables of the premises in relation to a comfort chart.

15. The computing device of claim 11, wherein the instructions executed by the processor cause the processor to perform the steps of:
generating a suggested temperature setting of the premises based on a calculated comfort zone;
receiving a user input; and
adjusting at least one of a temperature, humidity, and airflow setting of the premises based on the calculated comfort zone and the user input.

16. The computing device of claim 11, wherein the instructions executed by the processor cause the processor to perform the steps of:
capturing a plurality of thermal images of a bedroom of the premises in which an occupant retires to bed; and
correlating, at the time each thermal image is captured, the plurality of captured thermal images with one or more monitored environmental conditions relative to the premises.

17. The computing device of claim 16, wherein the instructions executed by the processor cause the processor to perform the steps of:
upon detecting the occupant retiring to bed, capturing a thermal image of the bedroom; and
detecting one or more current environmental conditions relative to the premises.

18. The computing device of claim 17, wherein the instructions executed by the processor cause the processor to perform the steps of:
identifying a closest match between the one or more current environmental conditions and one or more monitored environmental conditions correlated with the plurality of captured thermal images; and
identifying a captured thermal image from the plurality of captured thermal images correlated with the one or more monitored environmental conditions that matches closest to the one or more current environmental conditions.

19. The computing device of claim 18, wherein the instructions executed by the processor cause the processor to perform the steps of:
  determining a thermal exchange of the bedroom by comparing the captured thermal image of the bedroom with the identified captured thermal image from the plurality of captured thermal images; and
  calculating a suggested target temperature based on an analysis of the determined thermal exchange in light of any detected adjustment to a target indoor temperature relative to the identified captured thermal image.

20. A non-transitory computer-readable storage medium storing computer executable instructions that when executed by a processor of an automation control panel cause the processor to perform the steps of:
  configuring a setting to trigger a thermal sensor to capture a thermal image of an area inside a premises, the thermal sensor being communicatively coupled to the automation control panel;
  capturing, via the thermal sensor, a first thermal image of the area inside the premises;
  detecting, via the processor, the trigger, the trigger comprising detecting an occupant of the premises retiring for bed;
  upon detecting the trigger, capturing, via the thermal sensor, a second thermal image of the area inside the premises;
  comparing, via the processor, the first thermal image with the second thermal image to identify a thermal exchange in the area inside the premises, wherein comparing the first thermal image with the second thermal image comprises comparing the temperature of an object as captured in the first thermal image to the temperature of the object as captured in the second thermal image; and
  improving an efficiency of a heating ventilation and air conditioning (HVAC) system at the premises by adjusting the HVAC system based at least in part on a result of the comparing.

* * * * *